3,383,394
Patented May 14, 1968

3,383,394
NOVEL 17-ACYLATING PROCESS AND
PRODUCTS THEREOF
Lois Weber, Springfield, Elliot L. Shapiro, Cedar Grove,
Lawrence E. Finckenor, Wayne, and Hershel L. Herzog,
Glen Ridge, N.J., assignors to Schering Corporation,
Bloomfield, N.J., a corporation of New Jersey
No Drawing. Filed Aug. 30, 1965, Ser. No. 483,808
10 Claims. (Cl. 260—397.45)

ABSTRACT OF THE DISCLOSURE

This invention relates to the process for the direct esterification of the tertiary 17α-hydroxy group of a 17α-hydroxy pregnane which comprises treating a 17α-hydroxy pregnane, at about room temperature, with an acylating agent comprising a hydrocarbon carboxylic acid, trifluoroacetic anhydride and a strong acid catalyst. The invention also relates to the novel products produced by the foregoing process.

---

This invention relates to a novel process for acylating the 17α-hydroxy group of a 17α-hydroxy steroid of the pregnane series and to valuable products obtained thereby.

Heretofore direct acylation of the tertiary 17α-hydroxy group in a compound of the pregnane series has been accomplished by utilizing somewhat forcing means of temperature and reagent, particularly the former. For example, it is known that an acylating reagent consisting of trifluoroacetic anhydride and an alkanoic acid will produce a 17α-alkanoate provided the reaction temperature is maintained in the range of 80–100° C. At these temperatures destruction of valuable steroid substrate is frequently observed. At lower temperatures, e.g., 60° C., the 17α-hydroxyl group remains substantially unaffected while other more reactive hydroxyl groups which may be present are readily esterified. In addition, an acylating reagent comprising an alkanoic anhydride and a strong acid, such as p-toluenesulfonic acid, has been used to form a 17α-alkanoate. This reaction, however, is temperature dependent and when carried out at room temperature the kinetics of the reaction are such that long periods of time, as long as 48 hours, are required to effect the reaction to a reasonable state of completion. To date, therefore, no method has been described whereby direct acylation of the tertiary 17α-hydroxy group in a steroid of the pregnane series could be effected in good yield at moderate temperatures and with relatively short reaction times.

Applicants have now found, however, that a three-component acylating medium made up of trifluoroacetic anhydride, a strong acid catalyst, and a hydrocarbon carboxylic acid provides an optimum circumstance whereby the 17α-hydroxy group forms an ester with the alkanoic acid in good yield after a relatively short reaction (one to three hours) and at relatively low and easily controlled temperatures (room temperature).

The invention sought to be patented in its process aspect, therefore, may be described as residing in the concept of a process for the direct acylation of the tertiary 17α-hydroxy group in a steroid of the pregnane series which comprises treating said 17α-hydroxy steroid with an acylating reagent comprising a hydrocarbon carboxylic acid, trifluoroacetic anhydride and a strong acid catalyst at about room temperature whereby the corresponding 17α-alkanoate is formed in excellent yield accompanied by a minimum of side reactions.

The term, "strong acid catalyst," as employed herein is intended to include those acids which in aqueous solution are essentially completely ionized and which may be titrated utilizing a strong acid color indicator. The strong acid catalysts useful in the process of this invention are principally non-oxidizing organic and inorganic mineral acids which do not partake adversely in the reaction such as, for example, toluene sulfonic acid, methanesulfonic acid, benzenesulfonic acid, perchloric acid, hydrochloric acid, sulfuric acid, and the like. Para-toluene sulfonic acid is particularly preferred.

Selection of the hydrocarbon carboxylic acid employed in the acylating medium of this invention will depend essentially upon the nature of the 17α-ester grouping which it is desired to introduced; the hydrocarbon carboxylic acid corresponding to the desired ester grouping being selected. In general, therefore, any hydrocarbon carboxylic acid could be employed including, for example, alkonic acids, both straight and branched chain, saturated or unsaturated, aromatic carboxylic acid and heterocyclic carboxylic acid. Usually hydrocarbon carboxylic acids having from 1–9 carbon atoms will be employed in the preparation of therapeutically important 17α-esters of the pregnane series and will include, for example, acetic acid, propionic acid, butyric acid, valeric acid, benzoic acid, cyclopropylcarboxylic acid, octaonic acid, and the like.

By employing the term "pregnane series," applicants intend it to be understood that the process of this invention is one of general applicability. Any 17α-hydroxy steroid of the pregnane series, therefore, may be treated according to the process of this invention to form the corresponding 17α-ester.

Among the starting materials useful for 17α-acylation according to the novel process described herein are monohydroxy steroids such as 17α-hydroxyprogesterone, 16-methylene-17α-hydroxyprogesterone, 16-methyl (α or β)-17α-hydroxyprogesterone, and the like. When the A-ring of the starting material contains a 3-keto group and is otherwise saturated, or a 3-keto-Δ⁴-monoene system, the immediate product may contain some corresponding 3-enol ester. In such cases, the 3-keto group is regenerated by treating the enol ester with mild acid or base in known manner for such conversions. In addition, useful starting materials include corticoids and intermediates leading thereto such as 21-esters of prednisone, 16α-methyl-prednisone, 16β-methylprednisone, also 11-trifluoroacetate-21-esters of betamethasone, dexamethasone, flumethasone, paramethasone, prednisolone, 6α-methylprednisolone, hydrocortisone, and the like; also 9α-bromo and chloro analogs of the foregoing 9α-fluoro compounds; also 11-trifluoroacetate-21-esters and 11-trifluoroacetate-16,21-diesters of triamcinolone; also 17α-hydroxypregnenolone-3-lower alkanoate, 17α-hydroxy-pregnenolone, and the like. It is evident from the foregoing that the sole requirement for the starting material is that it possess an esterifiable 17-hydroxy group. It is evident that certain starting materials are preferable for the reason that valuable end products may be obtained therefrom more readily than from others.

Generally, in order to effect the 17α-acylation according to the process of this invention a 17α-hydroxy steroid of the pregnane series is dissolved in a molar excess of the hydrocarbon carboxylic acid containing the strong acid catalyst (usually from 50 to 150 mg. of acid catalyst per gram of 17α-hydroxy steroid). An inert solvent may be used as a diluent; however, this is generally unnecessary. The mixture is preferably cooled below room temperature and thereupon there is added an excess of trifluoroacetic anhydride (usually about 1–5 ml. of anhydride per gram of 17α-hydroxy steroid). After stirring up to three hours at room temperature, the reaction mixture is diluted with water and the 17α-ester isolated therefrom, by conventional techniques.

It is apparent from the chemistry of the novel process of this invention that said process is not selective. Thus, any hydroxy groups which may be present elsewhere in the steroid will first have to be protected, for example, by ester groups, unless it is desired that said hydroxy groups be converted into the same ester function as that which will appear at the 17α-position. Since it generally will not be desired to have multiple or refractory ester groups, selective protection of hydroxy groups other than at C-17 is preferably effected. A hydroxy group when present at C-21, or elsewhere save for an 11-hydroxy group, is preferably converted by methods well-known in the art into a hydrocarbon carboxylic acid ester such as a lower alkanoyl ester, or into a carb-loweralkoxy group.

The 21-hydroxy group in betamethasone, for example, may be converted into a lower alkanoyloxy grouping by treating the free 21-ol with a lower alkanoic acid chloride or anhydride in pyridine. Thus betamethasone acetate may be prepared by treating betamethasone in pyridine with the acid chloride of acetic acid or with acetic anhydride at a temperature of about 0 to about 30° C. for about 1 to 24 hours. A carb-loweralkoxylate grouping may be introduced at C-21 by treating the free 21-ol in pyridine with a lower alkylchlorformate under the conditions indicated above. The 21-carbethoxylate of betamethasone, for example, may be prepared by treating betamethasone in pyridine with ethylchlorformate at a temperature of about 0 to about 30° C. for about 1 to 24 hours.

When the 17α-hydroxy steroid starting compound also possesses an 11β-hydroxyl group, such a hydroxyl function is best protected by conversion into an 11β-trifluoroacetate. Such an ester is easily removed or hydrolyzed by methods well-known in the art to regenerate the 11-hydroxyl function. If a 21-hydroxy compound is used in the reaction, the product obtained will contain the same ester group at both the 17- and 21-positions. When this is desirable, this method offers a preferred means for achieving such a result. It is known that a free 11β-hydroxyl function is an important component for most anti-inflammatory corticosteroids.

Although the novel process of this invention is generally applicable to the acylation of 17α-hydroxy steroids of the pregnane series, it is particularly valuable in the 17α-acylation of 11β-trifluoroacetoxy-3,20-diketo-1,4-pregnadiene-17α,21-diols and their 21-hydrocarbon carboxylic acid esters or carb-loweralkoxy esters. The new class of steroidal triesters so produced have been found to be of great value as intermediates in the production of analogous 11β-hydroxy-17α,21-dialkanoyloxy esters and 11β, 21-dihydroxy-17α-alkanoyloxy esters.

Many 17,21-diesters and 17-monoesters of anti-inflammatory steroids of the pregnane series with hydrocarbon carboxylic acids having up to 9 carbon atoms are known to have very valuable characteristics in that said esters exert a most potent anti-inflammatory effect when administered topically, as determined by pharmacological and clinical tests. Of this series, and of particular importance, are certain 17-monoesters and 17,21-diesters of potent corticosteroids of which dexamethasone and betamethasone are prototypes. Thus, the novel process of this invention and the novel products obtained therefrom provide an advantageous and hitherto unknown means for obtaining the ultimate aforementioned end products.

The invention sought to be patented in its composition aspect, therefore, may be said to reside in the concept of a 3,20-diketo-1,4-pregnadiene having at the 17α-position a lower alkanoyloxy group and at the 21-position a member of the group consisting of lower alkanoyloxy and carb-loweralkoxy and characterized by a trifluoroacetoxy group at the 11β-position.

The tangible embodiments of the composition aspect of this invention, as pointed out above, are 11-trifluoroacetate - 17,21-diesters of 1,4-pregnadiene-11β,17α,21-triol-3,20-diones. The acyl group at C-17 may contain up to 9 carbons and thus included therein are, for example, acetate, propionate, butyrate, valerate, hexanoate, cyclopentylcarboxylate, enanthate, benzoate, cyclopentylpropionate, phenylpropionate, and the like, and their analogous branched chain analogs, where applicable.

The acyl group at the C-21 position includes those having up to 9 carbon atoms including straight and branched chain such as exemplified for the C-17 ester. The carbalkoxy group which may be present at C-21 is governed principally by availability of material and includes those having up to about 9 carbon atoms but preferably those having 2 to 3 carbon atoms.

The 11-trifluoroacetate-17,21-diesters representing the tangible embodiment of this invention are converted to the corresponding 11β-hydroxy-17,21-diesters by selective hydrolysis of the 11β-trifluoroacetate group. This is readily accomplished by stirring at room temperature an alcoholic solution of the 11-ester with an alkali metal salt of a weak acid. Preferably this is accomplished by means of sodium azide or sodium fluoride in methanol. Where the 11-trifluoroacetate-17,21-diester also contains a bromo, chloro or iodo substituent at the 9α-position, treatment of such compound with weak base, such as potassium or sodium acetate in acetone, effects elimination of the acyl moiety together with the halogeno atom giving rise to a 9β,11β-oxido-17,21-diester. This latter substance upon reaction with hydrogen halide (preferably hydrogen fluoride) in the known manner regenerates the 9α-halo(fluoro)-11β-hydroxy function.

The 17,21-diesters obtained as per the above are converted into the 17α-monoester by selective hydrolysis of the 21-ester by known means such as by use of alcohol acid solution, e.g., perchloric acid in methanol.

The following examples are illustrative of the means for effecting the invention in its process and product aspects and are presented for illustrative purposes only.

PREPARATION 1

With the temperature maintained at −20° C., add 5 ml. trifluoroacetic anhydride to 50 ml. dry pyridine followed by 5 g. betamethasone acetate and agitate for ½ hour. Pour the reaction mixture into 500 ml. iced water containing 44 ml. concentrated hydrochloric acid. Agitate for ½ hour, filter the precipitate and wash with water until the washes are neutral. Dry at 50° C. Crystallize from aqueous methanol to yield betamethasone 11-trifluoroacetate 21-acetate.

PREPARATION 2

In the manner of Preparation 1, 16α-hydroxy-9α-fluoroprednisolone 16,21-diacetate is treated with trifluoroacetic anhydride in pyridine to prepare 16α-hydroxy-9α-fluoroprednisolone 11-trifluoroacetate 16,21-diacetate.

By employing the procedure described in the foregoing preparations, it will be apparent to anyone skilled in the steroid art that the preferred 11-trifluoroacetoxy protective grouping may be added, where desired, to any 17α-hydroxy steroid of the pregnane series containing an esterifiable hydroxy group at the 11-position.

Example 1

To a chilled solution of 1 g. 16β-methyl-9α-fluoroprednisolone 11-trifluoroacetate 21-acetate and 100 mg. p-toluene-sulfonic acid monohydrate in 10 ml. valeric acid add 4 ml. trifluoroacetic anhydride. After 5 minutes remove from the ice bath and allow to stand at room temperature for 3 hours. Pour into water, stir for 15 minutes, and then take up in 100 ml. methylene chloride. Wash the methylene chloride once with 5% sodium hydroxide, three times with water, dry over magnesium sulfate and filter. Add 100 ml. methanol to the filtrate and steam distill to remove valeric acid. Cool to room temperature, dissolve the product in a small amount of methylene chloride, dry over magnesium sulfate, filter and chromatograph on 100 g. silica gel to yield betamethasone 11-trifluoroacetate 17-valerate 21-acetate.

Example 2

In the manner of Example 1, treat 8 g. 16β-methyl-9α-bromo-prednisolone 11-trifluoroacetate 21-carbethoxylate with 80 ml. valeric acid, 800 mg. p-toluenesulfonic acid monohydrate and 32 ml. trifluoroacetic anhydride to yield 16β-methyl-9α-bromo-prednisolone 11-trifluoroacetate 17-valerate 21-carbethoxylate. Crystallize from ether/hexane.

Example 3

In the manner of Example 1, treat 8 g. 16β-methyl-9α-bromo-prednisolone-11-trifluoroacetate 21-acetate with 80 ml. valeric acid, 800 mg. p-toluenesulfonic acid monohydrate and 32 ml. trifluoroacetic anhydride to yield 16β-methyl-9α-bromo-prednisolone 11-trifluoroacetate 17-valerate 21-acetate. Crystallize from acetone/i-propyl ether.

Example 4

In the manner of Example 1, treat 4.27 g. 16α-methyl-dichlorisone (16α-methyl - 9α,11β - dichloro-1,4-pregnadiene-17α,21-diol-3,20-dione) with 42.7 ml. butyric acid, 427 mg. p-toluenesulfonic acid monohydrate and 17.1 ml. trifluoroacetic anhydride to yield 16α-methyl-dichlorisone 17,21-dibutyrate. Recrystallize from aqueous methanol.

Example 5

In the manner of example 1, treat 16α-methyl-dichlorisone with propionic acid, p-toluenesulfonic acid monohydrate and trifluoroacetic anhydride to yield 16α-methyl-dichlorisone 17,21-dipropionate. Crystallize from aqueous methanol.

Example 6

In the manner of Example 1, treat 500 mg. 16α-methyl-dichlorisone 21-acetate with 5 ml. butyric acid, 50 mg. p-toluene-sulfonic acid monohydrate and 2 ml. trifluoroacetic anhydride to yield 16α-methyl-dichlorisone 17-butyrate 21-acetate. Recrystallize from aqueous methanol.

Example 7

In the manner of Example 1, treat 16β-methyl-dichlorisone with propionic acid, p-toluenesulfonic acid monohydrate and trifluoroacetic anhydride to yield 16β-methyl-dichlorisone 17,21-dipropionate. Crystallize from aqueous methanol.

Example 8

In the manner of Example 1, treat 4.09 g. dichlorisone with 41 ml. butyric acid, 409 mg. p-toluenesulfonic acid and 16.3 ml. trifluoroacetic anhydride to yield dichlorisone 17,21-dibutyrate. Recrystallize from methanol.

Example 9

In the manner of Example 1, treat 1.0 g. 16α-methyl-dichlorisone 21-acetate with 10 ml. 2-methylvaleric acid, 100 mg. p-toluenesulfonic acid monohydrate and 4 ml. trifluoroacetic anhydride to yield 16α-methyl-dichlorisone 17-(2'-methyl-valerate) 21-acetate. Recrystallize from methanol.

Example 10

In the manner of Example 1, treat prednisone with butyric acid, p-toluenesulfonic acid and trifluoroacetic anhydride to yield prednisone 17,21-dibutyrate. Crystallize from acetone-hexane.

Example 11

To a chilled solution of 1.0 g. 16-methylene-17α-hydroxy-progesterone and 100 mg. p-toluenesulfonic acid in 10 ml. caproic acid add 4 ml. trifluoroacetic anhydride. After 5 minutes remove from ice bath and allow to stand at room temperature for 30 minutes. Pour into water, stir for 15 minutes, and take up in 100 ml. methylene chloride. Wash once with 5% sodium hydroxide, three times with water, dry over magnesium sulfate and filter. Add 100 ml. methanol to the filtrate and steam distill to remove caproic acid. Cool to room temperature, dissolve in small amount of methylene chloride, dry over magnesium sulfate, filter and chromatograph on 100 g. Florisil with hexane/ether eluents. Recrystallize product from ether/hexane to yield 16-methylene-17α-hydroxy-progesterone 17-caproate.

Example 12

In the manner of Example 1, treat 16α-hydroxy-9α-fluoro-prednisolone 11-trifluoroacetate 16,21-diacetate with valeric acid, p-toluenesulfonic acid and trifluoroacetic anhydride to yield 16α-hydroxy-9α-fluoroprednisolone 11-trifluoroacetate 16,21-diacetate 17-valerate. Recrystallize from acetone-hexane.

As pointed out above, the novel 11-trifluoroacetate-17,21-diesters of this invention are readily converted into the corresponding 11β hydroxy-17α,21-dialkanoyloxy esters and 11β,21-dihydroxy-17α-alkanoyloxy esters thus serving as valuable intermediates in the preparation of these potent topical anti-inflammatory steroids. The following preparations will illustrate such conversions.

Example 13

In the manner of Example 1, treat 8 g. of 16β-methyl-9α - fluoro - prednisolone - 11 - trifluoroacetate - 21-carbethoxylate with 80 ml. of valeric acid, 800 mg. of p-toluenesulfonic acid monohydrate and 32 ml. of trifluoroacetic anhydride to yield betamethasone 11-trifluoroacetate-17-valerate-21-carbethoxylate.

Example 14

In the manner of Example 1, treat 8 g. of 16β-methyl-9α - fluoro - prednisolone - 11 - trifluoroacetate - 21 - propionate with 80 ml. of propionate acid, 800 mg. of p-toluenesulfonic acid monohydrate and 32 ml. of trifluoroacetic anhydride to yield betamethasone 11-trifluoroacetate-17,21-dipropionate.

PREPARATION 3

To a solution of 1 g. of betamethasone 11-trifluoroacetate-17α-valerate-21-acetate in 45 ml. of methanol, add 10 g. of sodium azide and stir at room temperature for 1 hour. Pour the reaction mixture into 450 ml. of cold water, filter and air dry at 60° C. Purify the crude betamethasone 17α-valerate-21-acetate by recrystallizing from acetone-hexane.

PREPARATION 4

Add 1 g. of betamethasone 17α-valerate-21-acetate to a solution of 7 ml. of 70% aqueous perchloric acid in 68 ml. of methanol maintained at about 0° C. Stir the reaction mixture for about 48 hours. Pour the reaction mixture into 700 ml. of cold water. Separate the precipitate by filtration; air dry at 40° C. and purify the crude betamethasone 17α-valerate by recrystallizing from acetone-hexane.

The subject matter which applicants consider to be their invention is particularly pointed out and distinctly claimed as follows:

1. The process for the direct esterification of the tertiary 17α-hydroxy group in a steroid of the pregnane series which comprises: treating a 17α-hydroxy steroid of the pregnane series at about room temperature with an acylating agent comprising a hydrocarbon carboxylic acid, trifluoroacetic anhydride and a strong acid catalyst.

2. The process of claim 1 wherein the strong acid catalyst is para-toluenesulfonic acid.

3. The process of claim 2 wherein the hydrocarbon carboxylic acid contains from 1–9 carbon atoms.

4. The process of claim 3 wherein the 17α-hydroxy-steroid of the pregnane series is betamethasone 11-trifluoroacetate-21-acetate and the hydrocarbon carboxylic acid is valeric acid.

5. The process of claim 3 wherein the 17α-hydroxy steroid of the pregnane series is betamethasone 11-trifluoroacetate-21-propionate and the hydrocarbon carboxylic acid is propionic acid.

6. The process of claim 1 wherein the steroid being esterified is an 11β-trifluoroacetoxy-17α-hydroxy-21-carb-loweralkoxy pregnane, said carb-loweralkoxy function having from 2 to 9 carbon atoms.

7. 3,20-diketo-1,4-pregnadiene having at the 17α-position a lower alkanoyloxy group having from 1 to 9 carbon atoms, carb-loweralkoxy having from 2 to 9 carbon atoms at the 21-position and characterized by a trifluoroacetoxy group at the 11β-position.

8. A compound of claim 7 of the following formula:

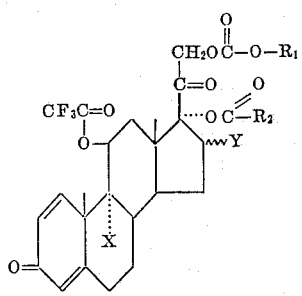

wherein each of $R_1$ and $R_2$ is lower alkyl having from 1 to 8 carbon atoms, X is a member selected from the group consisting of hydrogen, fluoro, chloro and bromo, and Y is a member selected from the group consisting of hydrogen, α-methyl and β-methyl.

9. A compound of claim 8 wherein $R_1$ is methyl, $R_2$ is butyl, X is fluoro, and Y is β-methyl; said compound being 16β-methyl-9α-fluoro-1,4-pregnadiene-11β,17α,21-triol-3,20-dione-11-trifluoroacetate-17-valerate-21-carbethoxylate.

10. A compound of claim 8 wherein $R_1$ is methyl, $R_2$ is butyl, X is bromo, and Y is β-methyl; said compound being 16β-methyl-9α-bromo-1,4-pregnadiene-11β,17α,21-triol-3,20-dione-11-trifluoroacetate-17-valerate-21-carbethoxylate.

References Cited

UNITED STATES PATENTS

| | | | |
|---|---|---|---|
| 3,104,246 | 9/1963 | Amiard et al. | 260—397.45 |
| 3,232,835 | 2/1966 | Figdor et al. | 167—65 |
| 3,297,729 | 1/1967 | Mancini et al. | 260—397.4 |

ELBERT L. ROBERTS, *Primary Examiner.*

UNITED STATES PATENT OFFICE
CERTIFICATE OF CORRECTION

Patent No. 3,383,394                  May 14, 1968

Lois Weber et al.

It is certified that error appears in the above identified patent and that said Letters Patent are hereby corrected as shown below:

Column 1, line 54, after "reaction" insert -- time --.
Column 2, line 9, "introdueced" should read -- introduce --.
Column 6, line 35, "propionate" should read -- propionic --.
Column 8, lines 6 and 11, "methyl", each occurrence, should read -- ethyl --.

Signed and sealed this 14th day of October 1969.

(SEAL)
Attest:

Edward M. Fletcher, Jr.                WILLIAM E. SCHUYLER, JR.
Attesting Officer                      Commissioner of Patents